(12) United States Patent
Cherolis et al.

(10) Patent No.: US 10,036,503 B2
(45) Date of Patent: Jul. 31, 2018

(54) SHIM TO MAINTAIN GAP DURING ENGINE ASSEMBLY

(71) Applicant: United Technologies Corporation, Hartford, CT (US)

(72) Inventors: Anthony P. Cherolis, Hartford, CT (US); Alexander Broulidakis, Tolland, CT (US); Matthew A. Hough, West Hartford, CT (US); Jonathan Lemoine, Vernon, CT (US); Christopher Treat, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 583 days.

(21) Appl. No.: 14/685,118

(22) Filed: Apr. 13, 2015

(65) Prior Publication Data

US 2016/0298472 A1 Oct. 13, 2016

(51) Int. Cl.
*F16L 55/00* (2006.01)
*F01D 9/06* (2006.01)
*F16L 21/035* (2006.01)

(52) U.S. Cl.
CPC .............. *F16L 55/00* (2013.01); *F01D 9/065* (2013.01); *F16L 21/035* (2013.01); *F05D 2240/58* (2013.01); *F05D 2300/43* (2013.01)

(58) Field of Classification Search
CPC ...................................................... F16L 55/00
USPC .................................................. 285/23, 302
See application file for complete search history.

(56) References Cited

U.S. PATENT DOCUMENTS

| 274,868 | A | * | 3/1883 | Watkins | F16L 13/128 |
| | | | | | 249/89 |
| 4,722,184 | A | | 2/1988 | Chaplin | |
| 5,127,793 | A | | 7/1992 | Walker | |
| 5,240,375 | A | | 8/1993 | Wayte | |
| 5,357,744 | A | * | 10/1994 | Czachor | F01D 9/065 |
| | | | | | 415/134 |
| 5,846,050 | A | | 12/1998 | Schilling | |
| 6,286,784 | B1 | | 9/2001 | Hardy | |
| 8,528,181 | B2 | | 9/2013 | Maurell | |
| 8,827,632 | B1 | * | 9/2014 | Lee | F01D 5/188 |
| | | | | | 415/115 |
| 2002/0044870 | A1 | | 4/2002 | Simonetti | |
| 2010/0133376 | A1 | | 6/2010 | Foyer | |
| 2013/0189071 | A1 | | 7/2013 | Durocher | |

(Continued)

FOREIGN PATENT DOCUMENTS

| EP | 546490 A1 * | 6/1993 | .............. F16L 27/12 |
| GB | 642585 A * | 9/1950 | .............. F01D 25/18 |
| GB | 2256688 A * | 12/1992 | .......... F01N 13/1811 |

OTHER PUBLICATIONS

Wikipedia.org, "Shim (spacer)", available at: <http://en.wikipedia.org/wiki/Shim_(spacer)>, downloaded Feb. 26, 2015.

(Continued)

*Primary Examiner* — David Bochna
*Assistant Examiner* — James A Linford
(74) *Attorney, Agent, or Firm* — O'Shea Getz P.C.

(57) ABSTRACT

Aspects of the disclosure are directed to a tube of an engine of an aircraft configured to transfer a fluid, a boss of the engine, and a shim coupled to at least one of the tube and the boss that is configured to maintain a gap between the tube and the boss when the engine is assembled.

12 Claims, 6 Drawing Sheets

(56) References Cited

U.S. PATENT DOCUMENTS

| | | |
|---|---|---|
| 2014/0079559 A1 | 3/2014 | Luczak |
| 2014/0093362 A1 | 4/2014 | Pickens |
| 2014/0223920 A1* | 8/2014 | Stevens ................ F01D 25/246 60/796 |
| 2015/0204245 A1* | 7/2015 | Marasco .................. F02C 7/28 415/110 |

OTHER PUBLICATIONS

Raymond E. Chupp, "Turbomachinery Clearance Control", available at: <http://ntrs.nasa.gov/archive/nasa/casi.ntrs.nasa.gov/20070005016.pdf>, downloaded Feb. 24, 2015.

* cited by examiner

SHIM TO MAINTAIN GAP DURING ENGINE ASSEMBLY

BACKGROUND

During an assembly activity associated with an engine of an aircraft, it may be desirable to maintain isolation between various engine components. Such isolation may include physically isolating the components from one another. In some instances, it may be desirable to avoid projecting/imparting a first load associated with a first of the components onto a second of the components.

To provide for the isolation described above, a gap/space may be maintained between the components to physically isolate the components. In some instances, this gap is not accessible or is hidden and cannot be set with a tool or removable shun.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a tube of an engine of an aircraft configured to transfer a fluid, a boss of the engine, and a shim coupled to at least one of the tube and the boss that is configured to maintain a gap between the tube and the boss when the engine is assembled. In some embodiments, the fluid comprises an airflow. In some embodiments, the shim is made of wax. In some embodiments, the shim is made of plastic. In some embodiments, the shim is made of polyethylene. In some embodiments, the system further comprises a seal coupled to the tube. In some embodiments, the system further comprises a rod coupled to the tube. In some embodiments, the system further comprises an outer case, where the rod is coupled to the outer case. In some embodiments, the system further comprises an inner case, where the rod is coupled to the inner case. In some embodiments, the system further comprises a second boss coupled to the boss. In some embodiments, the second boss is coupled to the boss via an inner case of the engine. In some embodiments, the system further comprises an inner case, where the boss is mounted to the inner case. In some embodiments, the shim is configured to vaporize at a temperature that is less than an operating temperature associated with the engine. In some embodiments, the shim is configured as a split-ring.

Aspects of the disclosure are directed to a method for assembling an engine of an aircraft, comprising: coupling a shim to at least one of a boss of the engine or a tube of the engine that is configured to convey a fluid to maintain a gap between the boss and the tube. In some embodiments, the method further comprises coupling a rod to the tube, an outer case of the engine, and an inner case of the engine. In some embodiments, the method further comprises coupling a second boss to the boss via the inner case of the engine. In some embodiments, the method further comprises centering a bearing relative to the outer case of the engine. In some embodiments, the shim is configured to maintain the gap between the tube and a flange of the boss. In some embodiments, the method further comprises coupling a seal to the tube, where the shim is located forward of the seal.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
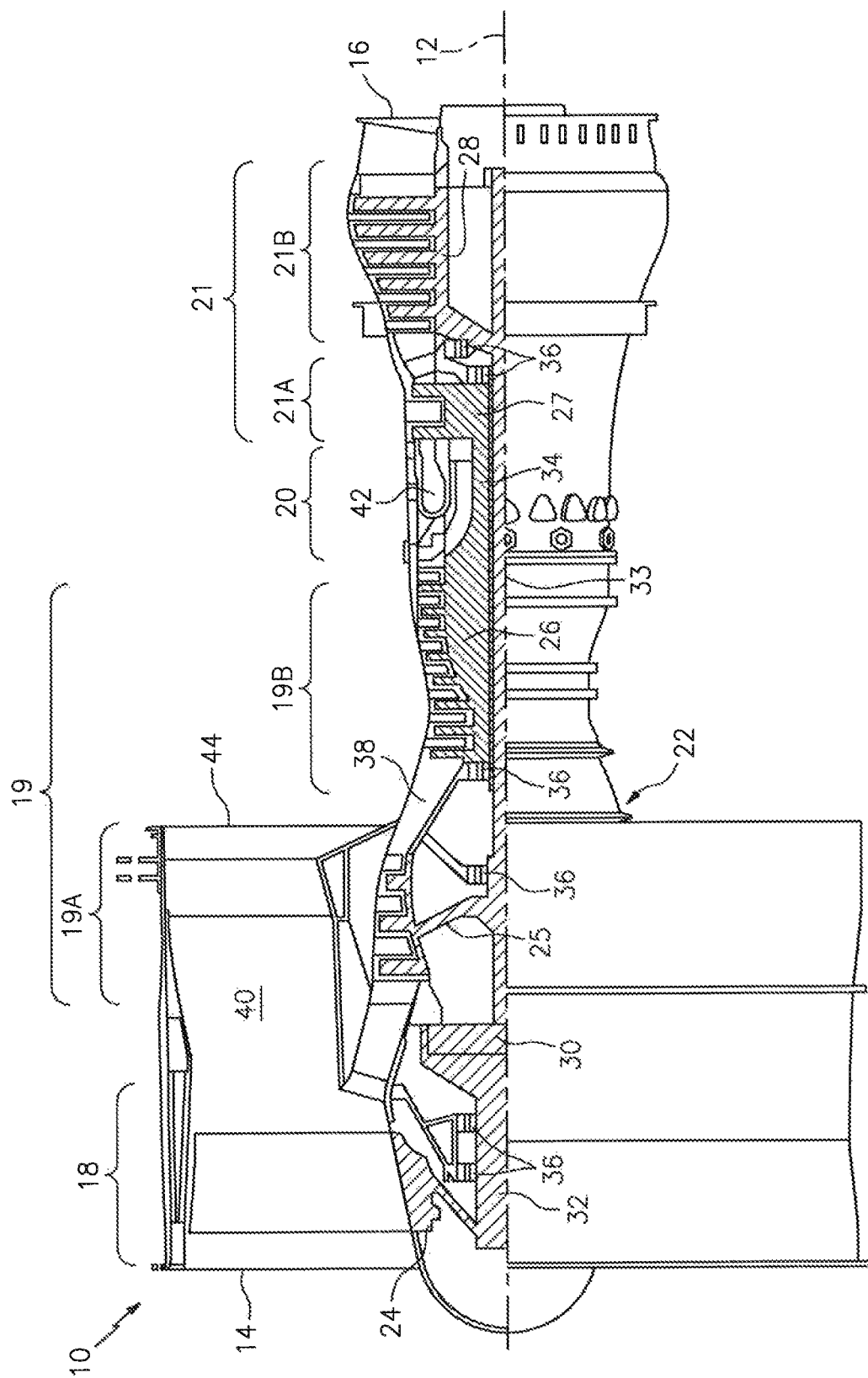
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, fix example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for an engine of an aircraft.

Figure 2A:
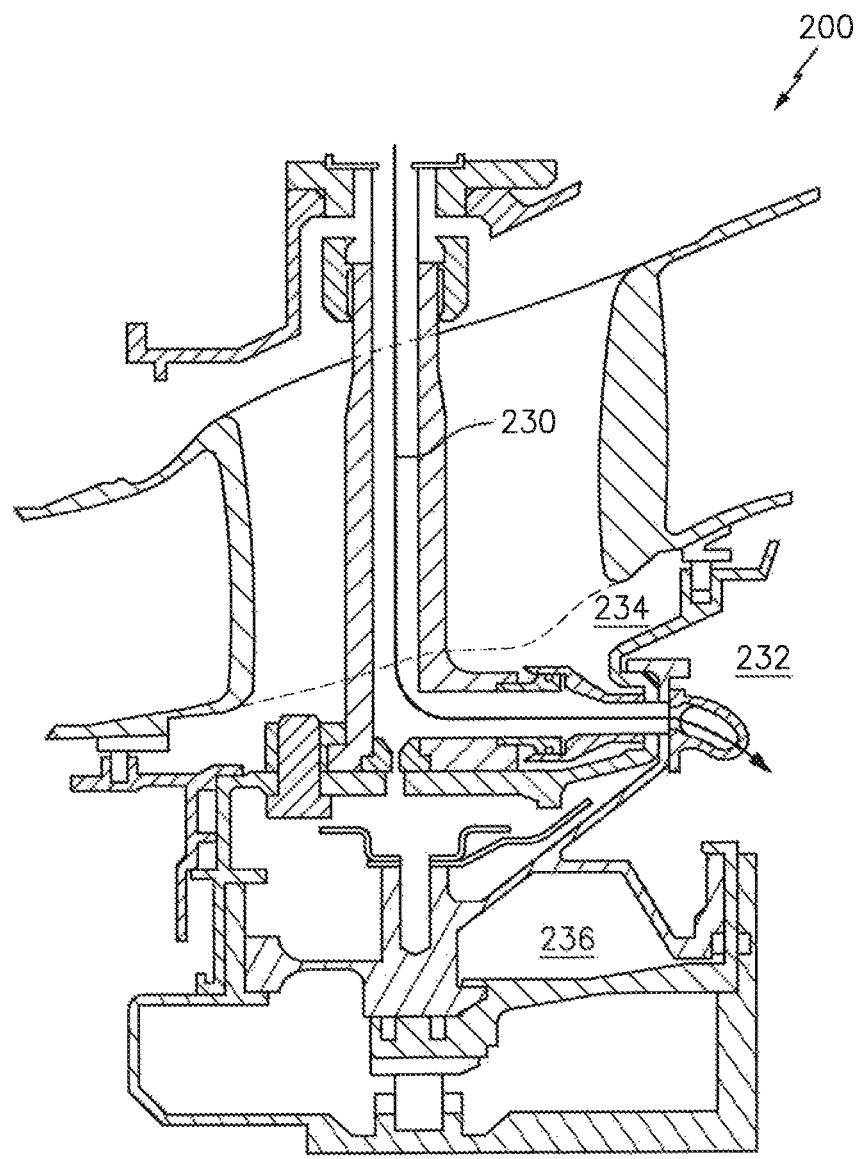
FIG. 2A illustrates a system associated with a frame of the engine of FIG. 1.
Figure 2B:
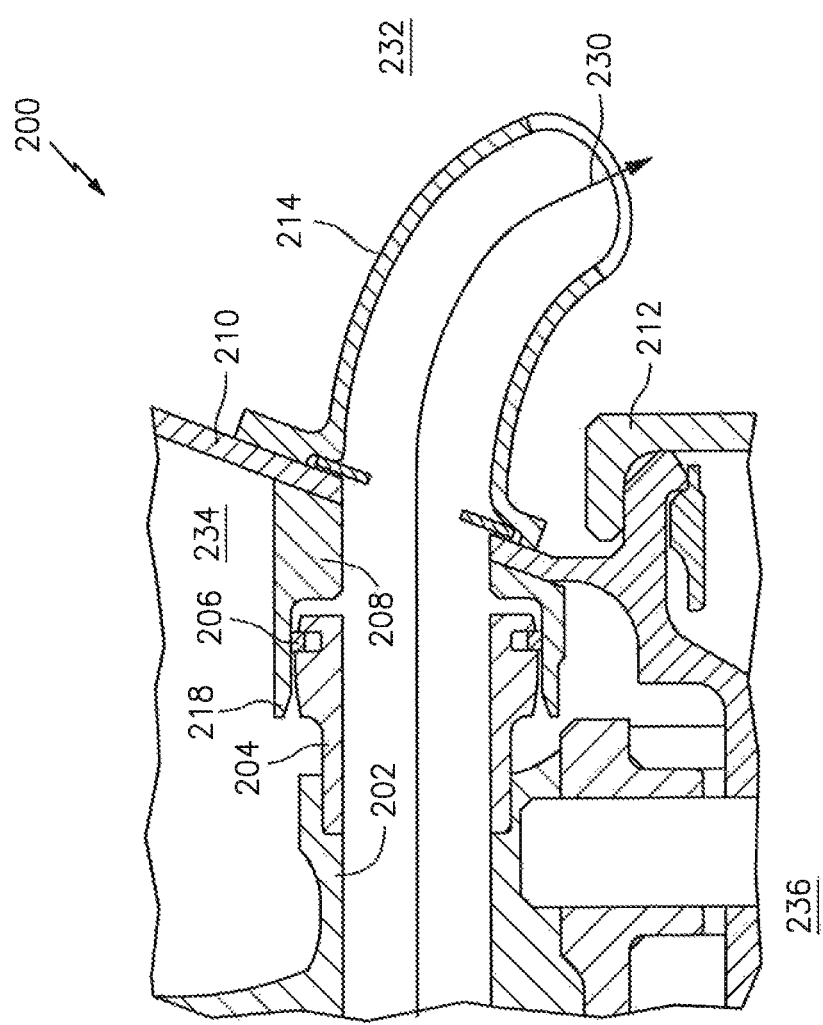
FIG. 2B illustrates the system of FIG. 2A in additional detail.

Referring to FIGS. 2A and 2B (collectively referred to as FIG. 2 herein), a system 200 is shown. The system 200 may be associated with an engine. For example, the system 200 may be associated with a support structure or frame associated with the turbine section 21 of the engine 10.

The system 200 may include a rod 202. The rod 202 may be referred to as an I-rod or tierod. The rod 202 may be used for coupling an outer case of the engine to an inner case 210 of the engine.

The system 200 may include a tube 204. The tube 204 may be used to transfer one or more fluids, such as for example an airflow. The airflow 230 may be used to cool and purge a low pressure turbine rotor cavity 232 and prevent hot gaspath air from entering the rotor cavity. The fluid may be received by the tube 204 from the tierod 202.

The system 200 may include a seal 206. The seal 206 may be a piston seal. The piston seal functions to isolate the airflow 230 from the air in the mid turbine frame cavity adjacent to a mid turbine vane 234. This adjacent cavity air 234 is at a higher temperature than the cooling flow 230 and has a higher risk of contamination by oil and oil vapor from a bearing compartment 236.

Figure 3:
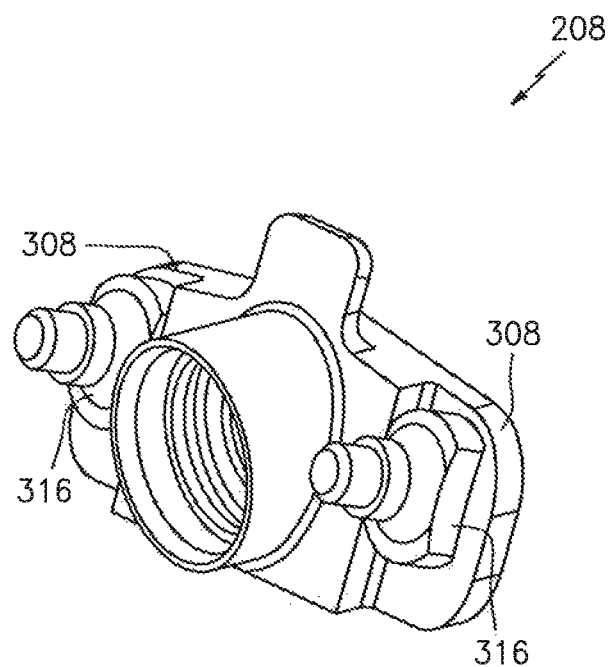
FIG. 3 illustrates a boss associated with the system of FIGS. 2A-2B.

The system 200 may include a boss 208. The boss 208 may include, or be referred to as, a cup boss. The cup boss 208 has a cylindrical feature that fits around the tube 204 and the seal 206. The boss 208 may be configured to mount to the inner case 210. Briefly referring to FIG. 3, the boss 208 may include one or more tabs 308 holding clinch nuts 316 to facilitate an assembly procedure.

Referring back to FIG. 2, the system 200 may include a flange 212. The flange 212 may be used to provide support for one or more bearings (e.g., bearings 36). The flange 212 may be located on an aft end of the bearing or an associated bearing housing.

The system 200 may include a boss 214. The boss 214 may include, or be referred to as, a swirler boss. The swirler boss 214 may direct the airflow 230 into the low turbine rotor cavity 232. The airflow may be swirled by the exit angle of the swirler boss 214 in the direction of rotation of the low turbine rotor to improve turbine efficiency.

The boss 208 may receive the aft end of the tube 204. The seal 206 may seal the gap between the cup 218 of the boss 208 and the tube 204. The forward end of the tube 204 may be coupled to (e.g., press-fit, brazed, or welded into) the tierod 202. The tube can alternatively be integrally formed with the tierod.

Thermo-mechanical relative motion may exist between the tube 204 and the flange 218. For example, during operation of an engine incorporating the system 200, the tube 204 may be compelled to move further radially outboard relative to engine centerline (e.g., axial centerline 12 of FIG. 1). To avoid driving stress into the tube 204 from the relative motion, the initial assembly gap between the tube 204 and the boss 208 (e.g., the flange 218) may be maintained with a shim.

Figure 4:
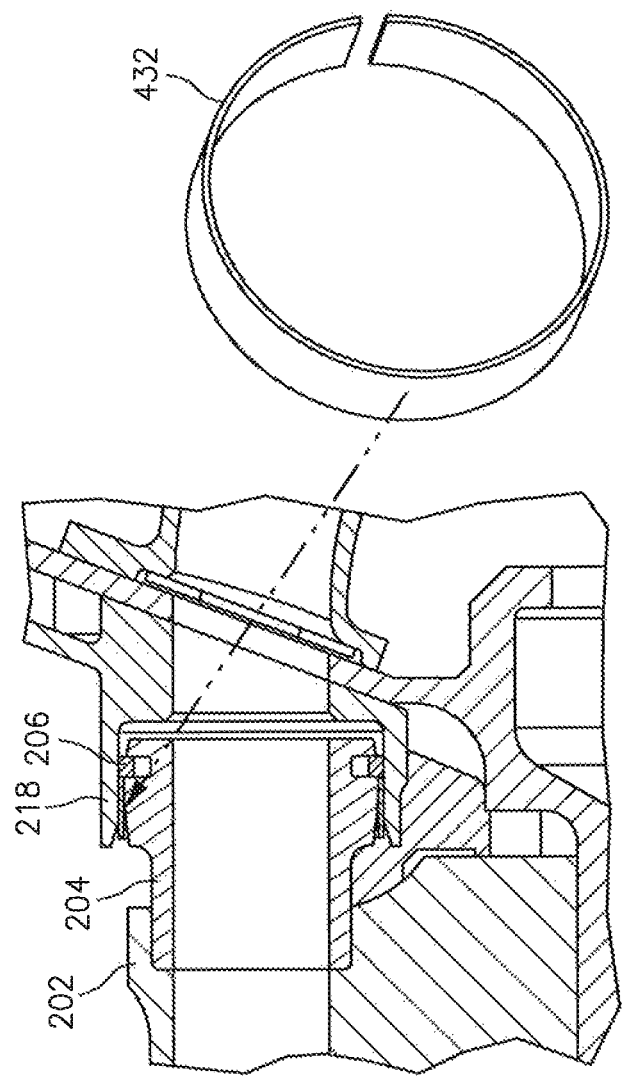
FIG. 4 illustrates a shim associated with the system of FIGS. 2A-2B.

Referring to FIG. 4, an example of a shim 432 that may be implemented between the tube 204 and the flange 218 is shown. The shim 432 may be used to maintain a gap/space between the tube 204 and the flange 218. The shim 432 may be located forward of the seal 206.

The shim 432 may be made of one or more materials. For example, the shim 432 may be made of plastic (e.g., polyethylene), wax, etc.

The shim 432 may melt or vaporize at a temperature that is less than an operating temperature of the engine. For example, the shim 432 may vaporize at a temperature between 200-400 degrees Fahrenheit (93.3-204.4 degrees Celsius), whereas the local operating metal components may operate at approximately 800-1000 degrees Fahrenheit (426.7-482.2 degrees Celsius). In this manner, the shim 432 may be used to maintain a gap during, e.g., engine assembly while not having a mechanical impact on the engine once operational temperatures are achieved during use.

The shim 432 may utilize a split-ring shape/configuration as shown in FIG. 4. Other shapes/configurations for the shim 432 may be used. The split ring shim 432 may be glued to the tube 204. Alternatively, the shim 432 could snap onto the tube 204 and be retained in place by friction or integrally formed locating features.

Figure 5:
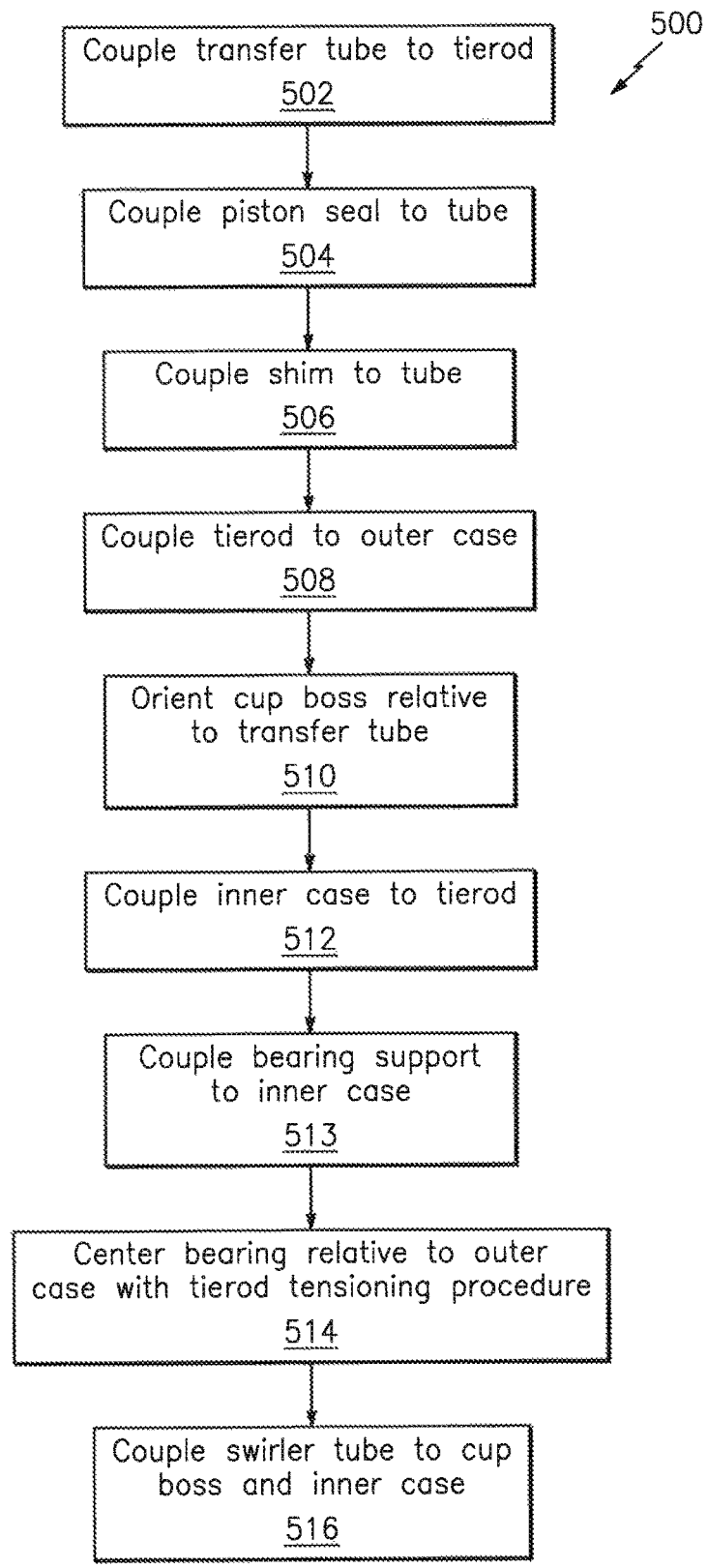
FIG. 5 illustrates a method for forming the system of FIGS. 2A-2B as part of a larger engine assembly procedure.

Referring now to FIG. 5, a flow chart of an exemplary method 500 is shown. The method 500 may be used to construct one or more engines or systems, or portions thereof.

In block 502, a transfer tube (e.g., the tube 204) may be coupled to (e.g., attached to) a tierod (e.g., the rod 202).

In block 504, a piston seal (e.g., the seal 206) may be coupled to the transfer tube.

In block 506, a shim (e.g., the shim 432) may be coupled to the transfer tube.

In block 508, the rod (or a sub-assembly formed from the components referenced in blocks 502-506 described above) may be coupled to the engine outer case or a vane assembly associated therewith.

In block 510, a first boss (e.g., the cup boss 208) may be slid over/oriented relative to one or more of the transfer tube, the seal, or the shim.

In block 512, an inner case (e.g., the inner case 210) may be coupled to (e.g., slid under or oriented relative to) the tierod. In this manner, the outer case and the inner case may be coupled to one another via the tierod.

In block 513, a bearing support may be coupled to the inner case.

In block 514, one or more bearings (e.g., bearings 36) may be centered relative to the outer case. Such centering may be used to ensure an airfoil (e.g., blade-tip) clearance is maintained. A position or location of one or more flanges (e.g., the flange 212) may be determined, or used, to provide for such centering. The centering of block 514 may be based on a tierod tensioning procedure.

In block 516, a swirler tube may be coupled to the first/cup boss and the inner case.

The method 500 is illustrative. In some embodiments, the blocks may execute in an order or sequence that is different from what is shown in FIG. 5. In some embodiments, one or more of the blocks may be optional. In some embodiments, additional blocks not shown may be included.

While the shim was described as being coupled to the tube in connection with the method 500 (see, e.g., block 506), in some embodiments the shim may be coupled to the first boss and then a sub-assembly formed from the shim and the first boss may be coupled to the tube.

In some embodiments, coupling described above in connection with the method 500 may be facilitated by hardware, such as for example one or more nuts, bolts, adhesives, etc. Any attachment hardware or attachment mechanisms may be used to facilitate the coupling.

Technical effects and benefits of this disclosure include an enhancement or extension of one or more engine component lifetimes. In some embodiments, a gap between two or more components of the engine may be maintained via the use of a shim. Engine durability/availability may be increased/maximized, particularly in embodiments that are free of metal shims.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. A system comprising:
   an internal tube of an engine of an aircraft configured to transfer a fluid;
   a boss of the engine; and
   a shim coupled to at least one of the tube and the boss that is configured to maintain a gap between the tube and the boss when the engine is assembled,
   wherein the shim is configured to vaporize at a temperature that is less than an operating temperature associated with the engine, and
   wherein the shim is configure as a split-ring to surround the tube.

2. The system of claim 1, wherein the fluid comprises an airflow.

3. The system of claim 1, wherein the shim is made of wax.

4. The system of claim 1, wherein the shim is made of plastic.

5. The system of claim 1, wherein the shim is made of polyethylene.

6. The system of claim 1, further comprising:
   a seal coupled to the tube.

7. The system of claim 1, further comprising:
   a rod coupled to the tube.

8. The system of claim 7, further comprising:
   an outer case,
   wherein the rod is coupled to the outer case.

9. The system of claim 8, further comprising:
   an inner case,
   wherein the rod is coupled to the inner case.

10. The system of claim 1, further comprising:
    a second boss coupled to the boss.

11. The system of claim 10, wherein the second boss is coupled to the boss via an inner case of the engine.

12. The system of claim 1, further comprising:
    an inner case,
    wherein the boss is mounted to the inner case.

* * * * *

UNITED STATES PATENT AND TRADEMARK OFFICE
CERTIFICATE OF CORRECTION

PATENT NO. : 10,036,503 B2
APPLICATION NO. : 14/685118
DATED : July 31, 2018
INVENTOR(S) : Anthony P. Cherolis et al.

Page 1 of 1

It is certified that error appears in the above-identified patent and that said Letters Patent is hereby corrected as shown below:

Column 1, Line 18, please delete "shun" and insert --shim--.

Column 2, Line 64, please delete "fix" and insert --for--.

Column 6, Line 7, please delete "configure" and insert --configured--.

Signed and Sealed this
Eleventh Day of September, 2018

Andrei Iancu
*Director of the United States Patent and Trademark Office*